(12) United States Patent
Rodriguez

(10) Patent No.: US 7,266,344 B2
(45) Date of Patent: Sep. 4, 2007

(54) REMOTELY ACTIVATED BRIDGE DEVICE FOR USE WITH A HOME NETWORK AND METHODS FOR PROGRAMMING AND USING THE SAME

(75) Inventor: Yan Rodriguez, Canton, OH (US)

(73) Assignee: Wayne-Dalton Corp., Mt. Hope, OH (US)

( * ) Notice: Subject to any disclaimer, the term of this patent is extended or adjusted under 35 U.S.C. 154(b) by 409 days.

(21) Appl. No.: 10/859,806

(22) Filed: Jun. 2, 2004

(65) Prior Publication Data

US 2005/0272372 A1    Dec. 8, 2005

(51) Int. Cl.
*H04B 7/00*    (2006.01)

(52) U.S. Cl. .................. 455/41.3; 455/343.1; 455/344; 340/825.69; 340/5.71

(58) Field of Classification Search ............... 455/41.1, 455/41.2, 418, 41.3, 88, 66.1, 344, 343.1, 455/343.5; 340/825.69, 5.71
See application file for complete search history.

(56) References Cited

U.S. PATENT DOCUMENTS

| | | | |
|---|---|---|---|
| 6,120,262 A | 9/2000 | McDonough et al. | 417/424.1 |
| 6,155,160 A | 12/2000 | Hochbrueckner | 99/331 |
| 6,243,000 B1 | 6/2001 | Tsui | 340/5.21 |
| 6,374,079 B1 * | 4/2002 | Hsu | 455/11.1 |
| 6,481,013 B1 | 11/2002 | Dinwiddie et al. | 725/80 |
| 7,027,945 B2 * | 4/2006 | Kelly | 702/107 |
| 7,183,940 B2 * | 2/2007 | Chuey | 340/825.69 |
| 2003/0210126 A1 * | 11/2003 | Kanazawa | 340/5.5 |
| 2004/0002367 A1 * | 1/2004 | Chanut | 455/574 |
| 2004/0198251 A1 | 10/2004 | Fitzgibbon | 455/91 |
| 2004/0203387 A1 * | 10/2004 | Grannan | 455/41.2 |
| 2004/0239496 A1 | 12/2004 | Fitzgibbon | 340/539.1 |
| 2005/0026603 A9 * | 2/2005 | Rajaram | 455/419 |
| 2005/0245245 A1 * | 11/2005 | Sorvari et al. | 455/418 |
| 2006/0181428 A1 * | 8/2006 | Blaker et al. | 340/825.22 |
| 2006/0187034 A1 | 8/2006 | Styers et al. | 340/545.1 |
| 2006/0192685 A1 * | 8/2006 | Chuey | 340/825.72 |
| 2006/0217850 A1 * | 9/2006 | Geerlings et al. | 701/2 |

* cited by examiner

*Primary Examiner*—Edward F. Urban
*Assistant Examiner*—Blane J. Jackson
(74) *Attorney, Agent, or Firm*—Renner Kenner Greive Bobak Taylor & Weber

(57) ABSTRACT

A bridge device linking transmitters to a home network includes a transmitter signal receiver adapted to receive transmitter signals in a transmitter format from at least one transmitter and a network signal transceiver adapted to transmit and receive network signals in a network format to and from a home network. A bridge controller is connected to the transmitter signal receiver and the network signal transceiver for the purpose of converting the signals between the formats. The bridge device is able to learn various transmitter type for conversion to a learned home network standard. A master controller may be used to assign specific transmitter button actuations to control specific appliance functions.

28 Claims, 6 Drawing Sheets

REMOTELY ACTIVATED BRIDGE DEVICE FOR USE WITH A HOME NETWORK AND METHODS FOR PROGRAMMING AND USING THE SAME

TECHNICAL FIELD

The present invention is generally related to a home network. In particular, the present invention is related to a home network that allows for communications between non-network transmitters and home appliances which may or may not be controlled by a personal computer. Specifically, the present invention is related to a bridge device that allows for transfer of signals between various electronic transmitters not normally part of a home network, such as those used for garage door openers, and a home network.

BACKGROUND ART

The home networking field has been increasing in popularity the last few years. The "digital home," as referred to by industry insiders, will supposedly enable consumers to network and interface various types of appliances and devices throughout the home. For example, it is believed that the network will allow linking of such home appliances as alarm clocks, stereo equipment, televisions and kitchen appliances. For example, after an alarm clock has sounded and the network detects activity in the bathroom in the morning, then the network can alert the coffee maker in the kitchen to begin preparation of a pot of coffee. Or, the bathroom scale can be continually monitored and provide input data upon each weighing to exercise software on a home computer linked to home exercise equipment.

Manufacturers from a wide variety of industries have been developing "networked" products to meet this emerging market. Due to lack of industry standards, manufacturers have engaged in developing their own proprietary network protocols and hardware in order to connect devices. As a response to the network incompatibility issue, some industry groups have been formed in order to create "standards" so that manufacturers following these standards are able to create compatible devices adhering to a specific protocol in software and hardware.

Groups such as WI-FI, which adhere to the 802.11×IEEE standards, are producing products today to allow fast connection between computer and multi-media systems. This particular standard is designed for transferring a large amount of data across a wireless network. Other groups such as the "Powerline" group have developed fast data transfer networks using the existing home electrical wiring. Yet other groups have formed standards such as HomeRF.

When fast data rates are required, the aforementioned standards work very well. However, in cases where simple control signals such as "on\off" and status are required, a fast data network becomes "overkill" for these simple applications. Manufacturers requiring a simpler type of network for control applications have developed standards such as "Zigbee" and "Z-wave" in an effort to keep their overall systems price competitive. These "control" networks add yet another level of complexity to the home integrator whose job is to make all of these systems work together seamlessly. In addition, different standards are being developed which presumably link the internet and cell phone communications systems with the home network. It is also believed that the home network may be extended into devices maintained in the garage or barriers that are accessible by the operator controlling the barrier, but the communication standards utilized by the garage door operator and the home network are not at all compatible. Since the goal of the home network is to connect all devices together and to offer consumers easy-to-use interfaces, it is necessary to develop interfaces capable of "bridging" devices utilizing incompatible communication protocols.

One example of a home network system is disclosed in U.S. Pat. No. 6,481,013 to Dinwiddie, et al. This patent discloses an apparatus for distributing radio frequency (RF) modulated broadcast television signals from a broadcast signal source to networked appliances connected to the source through a plurality of single conductor coaxial cables, simultaneously with distributing un-modulated digital signals and RF modulated video signals exchanged between the networked appliances over the same network coaxial cables. The apparatus provides bi-directional signal transmission over a single conductor coaxial cable and a network capable of conducting simultaneous bi-directional signal transmission of un-modulated digital signals, and radio frequency (RF) modulated signals over a single conductor coaxial cable. The apparatus also provides a network capable of providing bi-directional signal transmission of broadband, baseband and infrared signals over a single conductor coaxial cable. And the apparatus provides bi-directional transmission of high bandwidth broadband signals over a low bandwidth single conductor coaxial cable.

Another example of an interface device is provided by U.S. Pat. No. 6,155,160 to Hochbrueckner which discloses an electronic control for a grill, providing enhanced functionality and safety features. One of the features is a hydrocarbon detector system that provides an intermittently operated electro-optic device emitting photons at a wavelength which selectively interacts with hydrocarbon as compared to air, associated with a detector for detecting the selective interaction and an alarm monitor for detecting an alarm state. Another feature is a food temperature sensor that is employed to proportionately control combustible fuel flow rate, and thereby control a food temperature profile. Still another feature is a communications network interface is provided to allow remote control and monitoring. In one embodiment, the electronic systems include a networking device, for example a TCP/IP based communications interface, for communicating with other devices in the environment, or remotely. For example, the microprocessor may include a so-called embedded "web server" to communicate sensed conditions and to respond to received commands or requests for information. Of course, the controller need not itself implement these protocols, and may communicate with a translation or bridge device using another protocol. Therefore, the device may be integrated with other domestic electronics systems and communicate therewith. Various known physical link layers may be employed, such as 10 Base T, 10 Base 2, phone-line networking, AC power line networking, RF communications (e.g., 24 MHz, 49 MHz, 900 MHz or 2.4 GHz), infrared communications (e.g., IRdA), acoustic communications, or the like. In order to reduce power consumption, a wireless communication system preferably provides at least two modes of operation, an active mode wherein the communications latencies are short, and a low power mode wherein the communications are shut down or operated with long latencies. The system may switch between modes automatically or on external command.

Although the aforementioned devices are effective in their stated purpose, they do not address the incompatibility of different non-network components. In other words, there is a need in the art for a device that facilitates communication between remote transmitters or transmitters that control the operation of the movable barrier, or the like, with the appliances controlled by a home network.

SUMMARY OF THE INVENTION

Therefore, there is a need in the art for remotely activated bridge device for use with a home network and methods for programming and using the same Another object of the present invention, which shall become apparent as the detailed description proceeds, is achieved by a bridge device linking transmitters to a home network, comprising: a transmitter signal receiver adapted to receive transmitter signals in a transmitter format from at least one transmitter; a network signal transceiver adapted to transmit and receive network signals in a network format to and from a network; a controller connected to the transmitter signal receiver and the network signal transceiver, the controller converting the signals between the formats.

A further object of the invention is to provide a method for enabling a home network bridge device, including providing a controller linked to a transmitter signal receiver, a network signal transceiver, and a power supply system; detecting a type of power source connected to the power supply system; and selectively enabling a teach function module connected to the controller depending upon the type of power source detected.

Yet a further object of the invention is to provide a method for operating appliances connected to a home network system, including providing a bridge controller linked to a transmitter signal receiver and a network signal transceiver; receiving a transmitter signal in a transmitter format; converting the transmitter signal into a network signal in a network mode format; and emitting the network signal from the network signal transceiver for receipt by the home network system which controls operation of at least one appliance.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
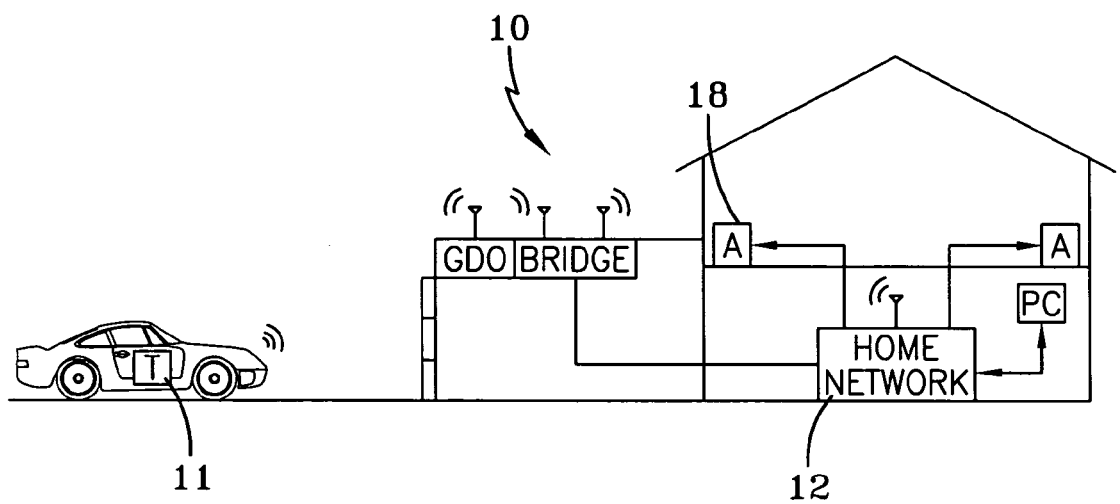
FIG. 1 is a schematic diagram of a home network employing a bridge device in accordance with the concepts of the present invention.

Referring now to the drawings and in particular to FIG. 1 it can be seen that a bridge device implemented within a home network scheme is designated generally by the numeral 10. Generally, the bridge device 10 functions as an interface between a transmitter 11 employed in the opening and closing of movable barriers such as a garage door, gate, or other related device, and a home network designated generally by the numeral 12. It will be appreciated that the home network 12 refers to any appliance type network maintained in a building, warehouse or similar structure. The bridge device 10, as will become apparent as the description proceeds, receives signals and communicates with at least one transmitter 11, designated as a T in the drawing, which may be carried by an automobile or other moving object. The transmitter is typically utilized with a garage door operator designated as "GDO" in FIG. 1, but could be some other type of wired or wireless transmitter. In other words, actuation of a button on the transmitter 11 generates a code that is received by both the garage door operator to control movement of the door and related features, and by the bridge device which passes along the code to the home network. Indeed, the transmitters may have more than one button wherein each button is assigned a specific function in the home network. And the bridge device may be configured to process transmitter codes solely for the operator or solely for the home network, or for both the operator and the home network. The transmitter may employ fixed or rolling codes in order to provide security features related to the opening and closing of the garage door and the network. Any one of the transmitters may be a "hands-free" transmitter which initiates a preset command based upon the proximity or direction of travel of the transmitter with respect to the garage door operator and/or the bridge device 10.

The home network 12 is connected either via wires or by wireless communication devices to appliances 18 such as air conditioners, furnaces, lights contained throughout the facility, entertainment systems, refrigerators, scales, personal computers, plumbing fixtures and the like. And the home network 12 may be linked to other home networks contained within a community or within a facility. Control of the home network may be implemented by a personal computer—designated as PC in the drawing—or a personal digital assistant, either of which may be referred to as a "master controller."

Figure 2:
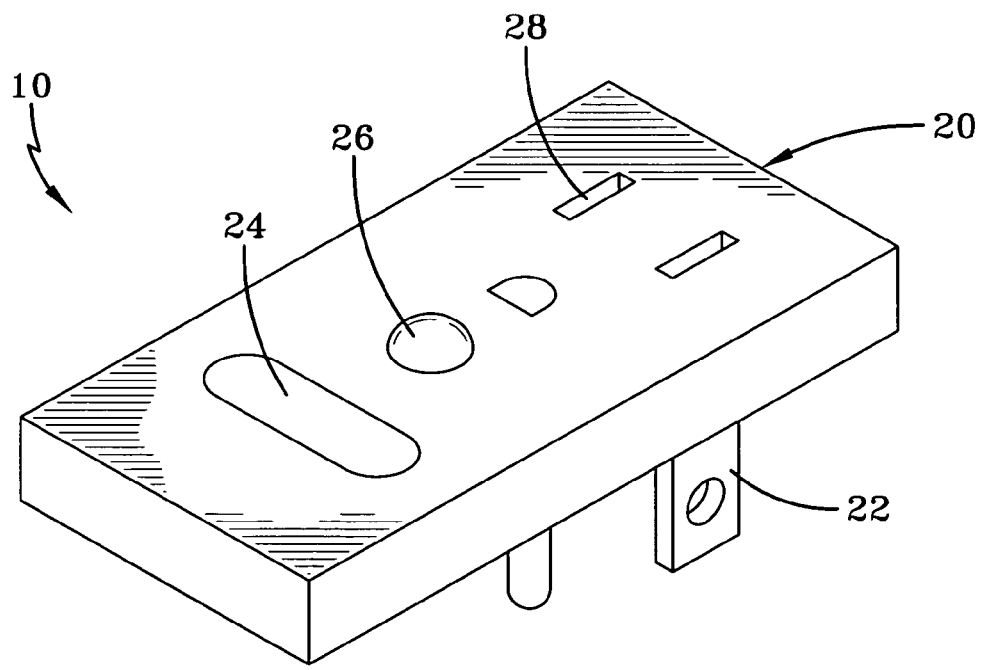
FIG. 2 is a perspective view of an exemplary bridge device made in accordance with the concepts of the present invention.

Referring now to FIG. 2, it can be seen that the bridge device 10 includes a housing designated generally by the numeral 20. The housing provides a standard power outlet plug 22 that fits in any receptacle. The plug may receive power directly from the residential power source such as 120V AC or it may receive power from any transformed power source that is grounded and complies with the appropriate safety standards. The housing 20 provides at least one learn switch 24 that is used to learn various components within the home network and the transmitter. The housing 20 also provides a status light 26 which may facilitate the learning of the bridge device with components within the home network and the transmitters. The housing 20 may also provide a power receptacle 28 which allows for a switched component to be associated with the bridge device.

Figure 3:
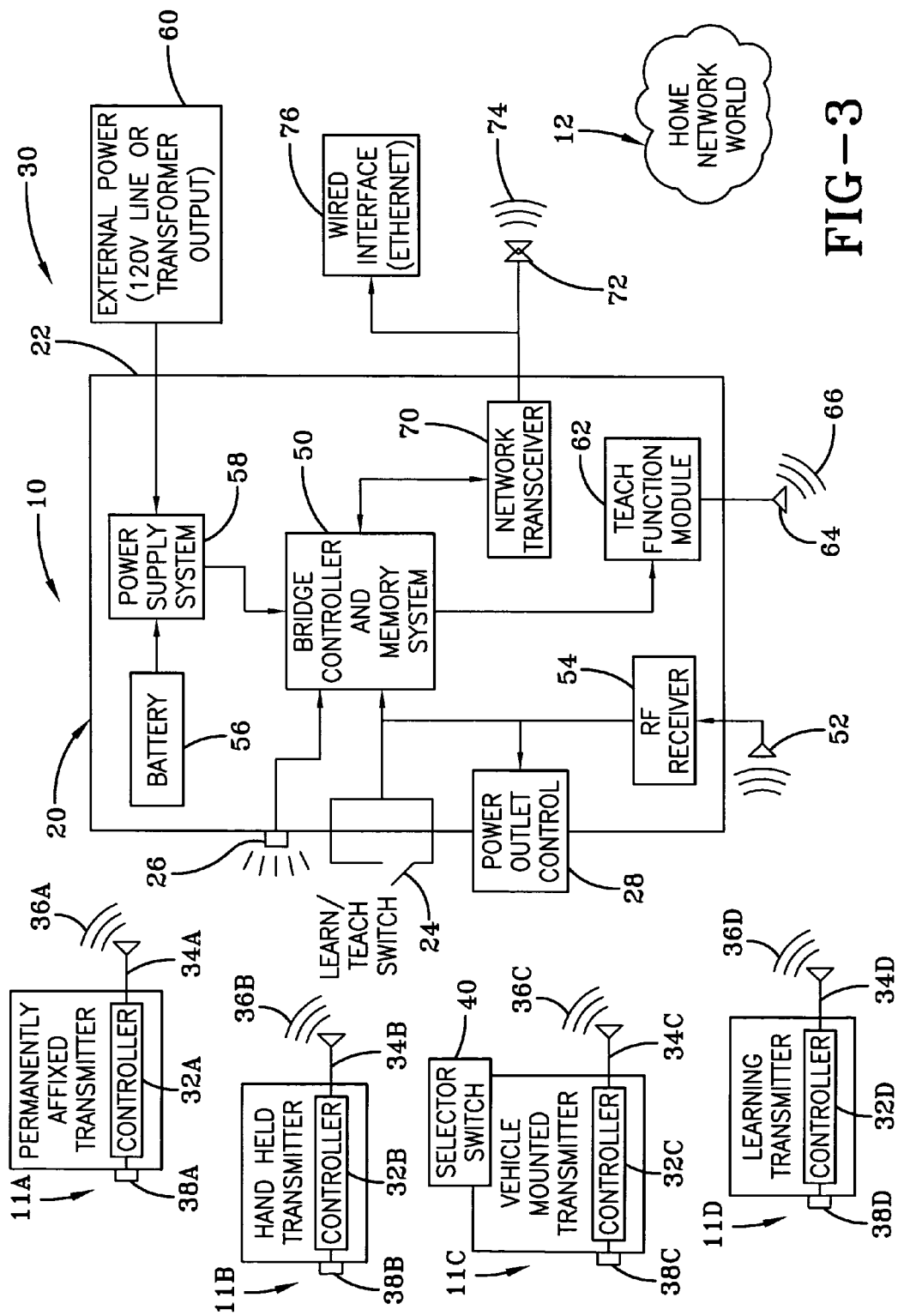
FIG. 3 is a schematic diagram of the exemplary bridge device employed in conjunction with transmitters utilized to move a barrier and initiate commands implemented by the home network.

Referring now to FIG. 3, it can be seen that an interface system is designated generally by the numeral 30. The interface system includes the bridge device 10 and at least one transmitter designated generally by the numeral 11. Also included within the system is the home network designated generally by the numeral 12.

Various types of transmitters may be employed in the interface system, although it is believed that in the preferred embodiment the transmitters are associated with a garage door operator that moves a barrier between predetermined limit positions. The transmitters are designated generally by the numeral 11, wherein each different type of transmitter is provided with a different alphabetic suffix. Likewise, each component with a particular transmitter is provided with corresponding alphabetic suffixes. Accordingly, a permanently affixed transmitter is designated generally by the numeral 11A and is attached to a wall or other surface and is commonly referred to in the art as a wall station or sometimes as a keyless entry device. The transmitter 11A includes a controller 32A which provides the necessary hardware, software and memory needed to communicate with the garage door operator and the bridge device 10. The controller 32A is connected to an antenna 34A for the purpose of transmitting and receiving a radio frequency signal designed generally by the numeral 36A. These signals may be generated upon actuation of a button 38A that is connected to the controller 32A. Although it is preferred that a radio frequency signal be employed it will be appreciated that other signals such as an infrared signal may be employed and, it will be appreciated that the permanently affixed transmitter may transmit or receive signals via a wired connection.

A handheld transmitter 11B may also be employed in the present invention and it includes a controller 32B that generates signals that are transmitted by an antenna 34B upon actuation of a button 38B. The controller 32B includes the necessary hardware, software and memory for communicating with the bridge device. The handheld transmitter may be in the form of a "hands-free" transmitter wherein the signals received by the bridge device and garage door operator system may be initiated when the automobile or like movable object carrying the transmitter moves within a predetermined distance of the bridge device. For example, if the handheld transmitter is a hands-free device and moves a distance of 300 feet to 100 feet from the operator it will be presumed that the device is moving toward the garage and causes the operator to move the barrier from a closed position to an open position. Other related movements of the transmitter may also effect the operation of the garage door operator and/or the components connected to the home network as programmed by the end-user.

Another type of transmitter may be a vehicle mounted transmitter designated generally by the numeral 11C. The transmitter 11C is provided with a controller 32C that has the necessary hardware, software and memory for implementing the concepts of the present invention. The controller 32C is connected to an antenna 34C for emitting a radio frequency signal 36C as deemed appropriate. A button 38C is connected to the controller 32C for emitting an appropriate signal when actuated to control operation of the garage door and bridge device. The vehicle mounted transmitter 11C includes a learning function selector switch designated generally by the numeral 40. The switch 40 allows the user to set the controller 32C to the garage door operator's manufacturer's code. In other words, a plurality of manufacturer's codes are pre-stored in the controller 32C and selected by positioning of the switch as needed. This allows the vehicle mounted transmitter to specifically communicate with both the garage door opener and the bridge device. Accordingly, the bridge device is compatible with virtually all types of transmitters used with movable barriers.

Still another type of transmitter is a learning transmitter designated generally by the numeral 11D. The transmitter 11D includes a controller 32D that has the necessary hardware, software and memory for operation in the system 30. The controller 32D is also operatively connected to an antenna 34D which emits an RF signal 36D. And the controller generates an RF signal when actuated. In some instances though, actuation of the button 38D places the transmitter in a learn mode so that an RF signal can be received, learned and stored by the controller. Such a learning function is embodied in the HomeLink™ system provided by Johnson Controls, Inc. and which is incorporated in some automobiles. Such a system allows for the user to program the HomeLink™ button contained within their automobile to control and operate the garage door opener. This eliminates the need for keeping a handheld remote transmitter within the automobile. It will be appreciated that other types of transmitter devices may be usable with the bridge device. In other words, any transmitting device that does not directly communicate with appliances in the home network, may be associated with the bridge device which can receive signals generated by the transmitter for conversion to the necessary format and convey the appropriate instructions to the network world 12.

The bridge device 10 includes the plug 22 that is mateable with any standard electrical outlet providing residential or facility power. And the device 10 also includes the learn/teach switch 24, the status light 26 and an appropriate power outlet control 28.

The bridge device 10 also includes a bridge controller and memory system designated generally by the numeral 50. The controller 50 is connected to all of the components mentioned above such as the plug 22, the switch 24, the status light 26 and the power receptacle 28. The controller and memory system 50 includes the necessary hardware, software and memory to facilitate communications between the bridge's internal components and to facilitate communications between the transmitters 11 and the network world 12. The bridge includes an antenna 52 that receives radio frequency or other types of wireless signals generated by the transmitters for transfer to an appropriate receiver 54. The receiver 54 is connected to the controller and receives at least signals 36A-D. The signals received by the receiver 54 are submitted to the controller and memory system 50 for validation and confirmation.

Contained within the housing 20 is an internal battery 56 which is preferably a long-life battery of about 3 volts. Of course, other battery voltages could be used if appropriate. The battery 56 is connected to a power supply control system 58 which is directly linked to the controller 50. Also connected to the power supply system is the plug 22 which receives external AC/DC power 60 which may either be 120V line or transformer output regulated power. The controller and memory system 50 defaults to the external power source 60 if connected. It will be appreciated as the detailed description proceeds that the type of power employed by the bridge device dictates the bridge's mode of operation which is employed for the learning of the various devices to the bridge and for the general operation of the bridge.

A teach function module 62 is connected to the controller 50 and undertakes various functions upon actuation of the learn/teach switch 24 and depending upon the power supply utilized by the controller 50. As will become apparent as the detailed description proceeds, actuation of the learn teach switch causes the controller and the teach function module to generate a code that is emitted by an antenna 64 preferably in the form of a radio frequency code 66. This code 66 may be received by the learning transmitter 11D as required by the end use.

A network transceiver, designated generally by the numeral 70, is connected to the controller and memory system 50 and functions to communicate directly with the network world 12 by generating a network radio frequency signal 74 that is emitted by an antenna 72. Alternatively, a wired interface 76 may be connected to the network transceiver 70 to allow for direct communications to the network world 12.

The bridge device has three modes of operation. The first mode of operation is active whenever the external power is not connected and as such the device is powered by the battery 56. The second mode of operation is active as soon as the device is plugged into the external source of power 60. And the third mode of operation is activated whenever power is received from the external power source and a valid code is received from a non-network transmitter or device. In other words, the third mode is the normal operation mode wherein the bridge device receives signals from a transmitter appropriately programmed to communicate with the bridge device and converts signals received from these transmitters into a format that is acceptable by the network. This mode also allows receipt of signals from the network 12.

Figure 4:
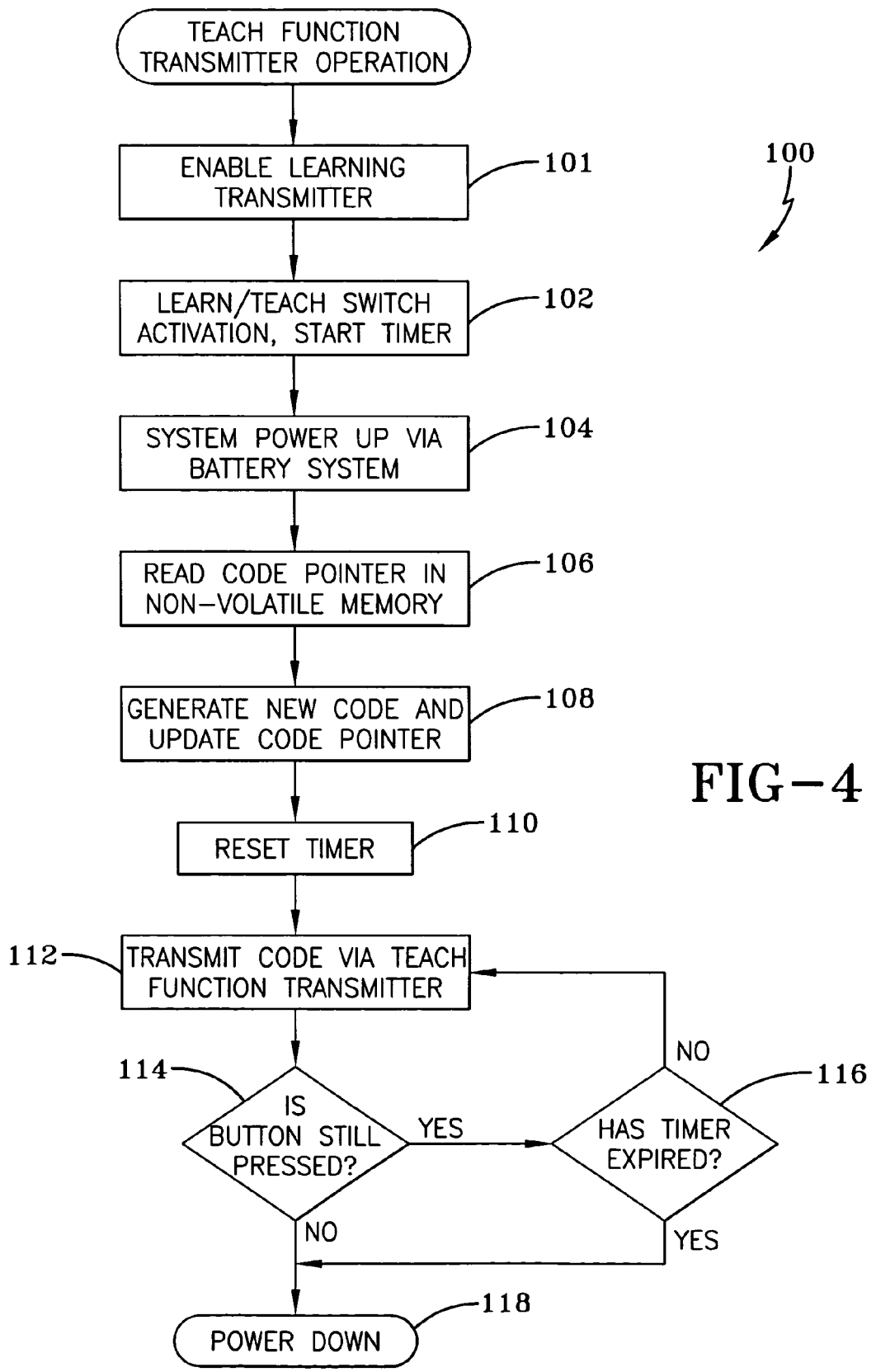
FIG. 4 is an operational flow chart illustrating the steps implemented in teaching a bridge device to one type of transmitter.

Referring now to FIG. 4, an operational flow chart illustrating the steps implemented in the first mode of operation is designated generally by the numeral 100. The bridge device 10 is preferably shipped from a factory without any transmitter codes programmed into the controller's memory. In other words, the bridge device is a "clean slate" and requires the programming of transmitters in order to function with the home network. This particular mode is specifically utilized to teach a code generated by the teach function module 62 to the learning transmitter 11D. In other words, for this mode, the end-user teaches a factory preset code from the bridge to the learning transmitter. In order to implement this operation, the user must place an unplugged—no external power supply present—bridge device in close proximity to the transmitter unit 11D.

The process is initiated at step 101 when the user places the transmitter 11D in its' learn state by actuating the button 38D or with other steps indicated in the user manual of the learning transmitter. Next, at step 102, the user activates the learn/teach switch 24 provided by the bridge device 10 which starts a timer. At this time, the controller 50 is powered at step 104 via the internal battery 56. At step 106, the controller 50 reads a code pointer provided in the controller's non-volatile memory. At step 108, the controller generates a new code and updates the code pointer. At step 110, the timer, which was started upon actuation of the switch at step 102, is reset. In the preferred embodiment, the timer has a predetermined time period of 40 seconds. Next, at step 112 the teach function module 62 transmits the code generated in step 108 for receipt by the learning transmitter 11D. At step 114 it is determined whether the learn/teach button is still being pressed and the controller investigates as to whether the timer has expired or not. If it has, then the process proceeds to step 118 and the bridge is powered down. However, if the timer has not expired at step 116 the process returns to step 112. In any event, the code generated by the controller 50 is transmitted by the teach function module and is received and stored by the learning transmitter 11D. Subsequent activations of the learning transmitter result in the transmission of the original code generated by the bridge device. Accordingly, the bridge device 10 now automatically recognizes any transmissions generated by the learning transmitter 11D. It will be appreciated that the learning transmitter may employ a rolling or fixed code if required.

Figure 5:
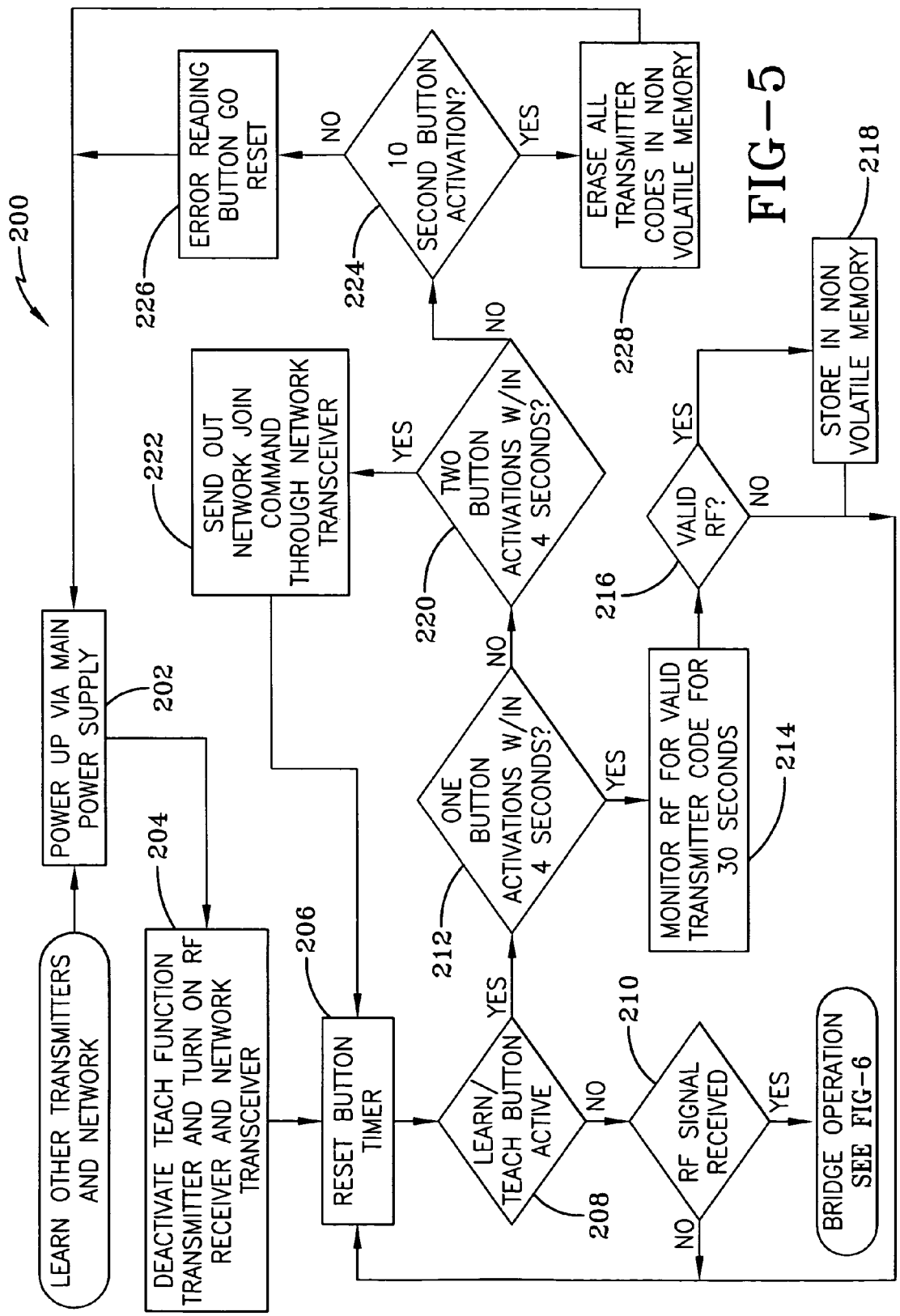
FIG. 5 is an operational flow chart illustrating the steps implemented to learn other transmitters and a home network to the bridge device.
Figure 6:
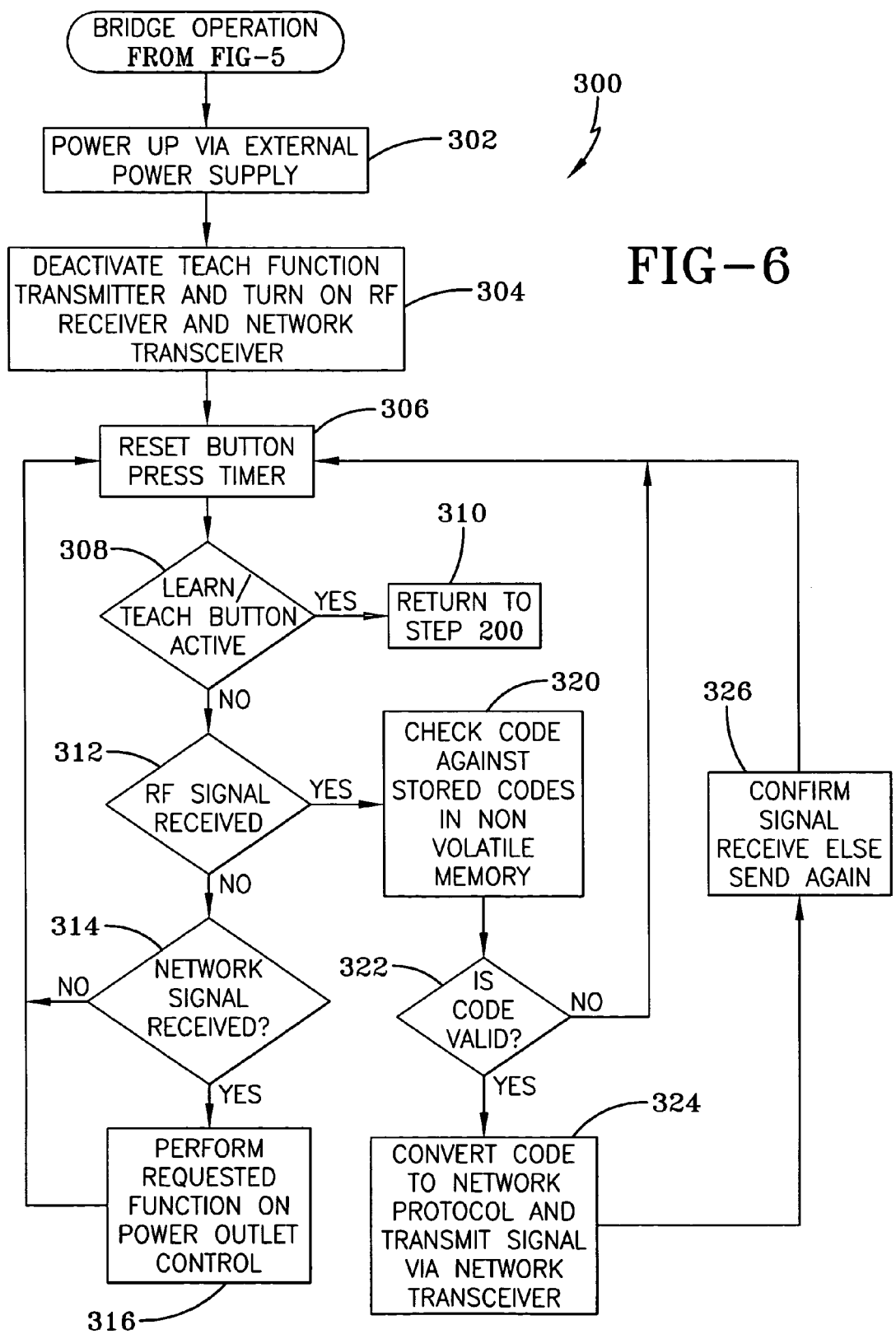
FIG. 6 is an operational flow chart illustrating the operational steps of the bridge device so as to allow communication between transmitters or the like and the home network.

Referring now to FIG. 5, a second mode of operation for the purpose of learning other types of transmitters (11A, 11B and 11C) and the network (12) to the bridge device is designated generally by the numeral 200. In this mode, the bridge device 10 is connected to the external supply 60 at step 202. Following this, at step 204, the controller 50 deactivates the teach function module and turns on the RF receiver 54 and the network transceiver 72. Next, at step 206, a reset button timer is actuated. Following this, the controller awaits actuation of the learn/teach button 24. If the button is not activated at step 208, then the process continues on to step 210 to await receipt of a radio frequency signal. If no signal is received within the timer period, then the process returns to step 206 and step 208 is repeated accordingly. If, however, at step 210 a radio frequency signal is received, then the process continues for the bridge operation mode which is designated generally by the numeral 300 and shown in FIG. 6.

Returning now to step 208, if the learn/teach button 24 is activated, then the controller 50 determines whether the button 24 has been actuated once or more than once. If the button has only been actuated once, preferably within a time period of four seconds, then at step 214 the receiver 54 monitors for a valid transmitter code for the next 30 seconds. Of course other durations could be employed for the 4 and 30 second periods of time. In any event, at step 216, the controller determines whether the radio frequency signal received from any of the transmitters 11 is valid or not. If the signal is invalid, then the process automatically returns to step 206. If the radio frequency signal is valid, then the radio frequency code is stored in the controller's non-volatile memory at step 218 and the process is then returned to step 206. Accordingly, steps 212-218 are employed for learning the transmitters 11A-C to the bridge device.

Returning to step 212, if there is more than one button activation within the predetermined period of time of four seconds, then the process proceeds to step 220 to determine whether there have been two button activations within four seconds. If this is the case, then the process continues to step 222 and the network transceiver 70 generates a network join command at step 222. This signal is received by the network world 12 and allows for communication of the bridge device to join with the network world 12 and, in turn, any of the transmitters programmed to the bridge device. Upon completion of step 222, the process returns to step 206.

If there is ever a need to delete all of the codes maintained by the bridge device, then the process at step 220 allows for this occurrence. In particular, if there is more than two button actuations within four seconds, then the process continues to step 224 to determine if the teach/learn switch is held in for a predetermined period of time such as 10 seconds. If for some reason the button is released before the 10 second time period then the process continues to step 226 and the process is reset at step 228 and continues to step 202. If, however, it is determined that the teach/learn button 24 is held for at least 10 seconds at step 224, then at step 228 the controller 50 in the bridge device erases all stored transmitter codes and the process returns to step 202.

In summary, by pressing the teach/learn switch device 24 within a short predetermined period of time such as four seconds, the bridge device is linked to the transmitters that are normally used for moving movable barriers. The network transceiver 70 is linked to the network 12 via the antenna 72 by emitting or receiving a radio frequency signal 74 or by a wired interface 76 which may utilize an ethernet connection 76.

Once all of the appropriate transmitters have been learned to the bridge device and the bridge device has been linked with the home network, the normal operation of the bridge may be implemented. Accordingly, referring now to FIG. 6, it can be seen that a method of operation is designated generally by the numeral 300. In this mode of operation the bridge device is required to receive power from the external power source at step 302. And at step 304, the controller 50 deactivates the teach function module 62 and turns on the RF transceiver and the network transceiver. Following this, at step 306, the reset button press timer is initiated. At step 308 the methodology determines whether the learn/teach button 24 has been activated or not. If so, then the process is returned to step 200 at step 310 and the methodology described in FIG. 5 is implemented. If, however, at step 308 there is not a learn/teach button activation, then at step 312 the controller determines whether a radio frequency signal is being received or not. If a signal is not being received from the any of the transmitters 11, then the process continues to step 314 to determine whether a network signal is being received via the transceiver 70. If not, then the process is automatically returned to step 306. If, however, at step 314 a signal 74 generated by the network 12 is received and the requested function is performed by the power outlet control 28. Thus, it will be appreciated that the network world 12 may generate signals that are received by the bridge device to toggle on and off any appliance that is connected to the output control 28. In this manner, added functionality is provided by the bridge device.

Returning now to step 312, if the receiver detects the presence of a transmitter RF signal, then the process continues to step 320 and the received signal is analyzed to determine its particular code and is checked against stored codes in the non-volatile memory maintained by the controller 50. At step 322 if it is determined that the code is invalid then the process is returned to step 306 and the timer is reinitiated. If, however, at step 322 it is determined that the received code is valid, then at step 324 the transmitter code is converted to a network code protocol or proper format and this signal is transmitted via the network transceiver 70 to the network world 12. It will be appreciated that the transmitter codes are stored in the controller's memory and assigned a particular network code. As will be discussed in further detail, the master controller assigns specific functions to each network code and thus each transmitter button. The network transceiver then at step 326, awaits a confirmation signal from the network, and if received the process returns to step 306. If the confirmation signal is not received, then the network code signal is re-generated. It will be appreciated that if a confirmation signal is not received after a predetermined period of time, the process eventually returns to step 306.

The normal mode of operation allows for the bridge to become active whenever a valid code is received through the built-in radio frequency receiver. In this mode, the bridge device is plugged into a permanent external power supply and the controller continuously monitors the RF receiver for signals. Whenever a valid signal is received, either, from the permanently affixed transmitter, a handheld transmitter, a vehicle mounted transmitter or a learning transmitter, then the bridge device converts this received transmitter code into a network code compatible with the home network protocol provided by the network world 12 and this signal is output via the network transceiver. In essence, the bridge device 10 is transparent to the user and simply functions as a "pipe" passing information through the system from one format to another. The user perceives the action of pressing a transmitter button with the reaction of a network function such as the opening of a door, turning lights on or off, the unlocking of a door, the activating or deactivating of an alarm system and the like.

From the foregoing it will be appreciated that the code generated by the bridge device in the first mode of operation is used to teach learning transmitters, such as a HomeLink™ device, and can be extended to teach multiple learning transmitters. Accordingly, with every press of the learn/teach switch, the bridge device 10 generates a unique code. By sending out a different code with every key or button actuation in this mode, the system 10 ensures that every learning transmitter learns a unique code. These unique codes may then be passed through the bridge device to the network during the normal mode of operation. Moreover, by transmitting unique codes, the master controller or network administrator, which may be implemented on a personal computer that coordinates the operations for the home network, may set up different functions for different transmitters. For example, a first transmitter may open a door and turn on the lights in the home while a second transmitter may be assigned to open a door and deactivate an alarm. The power outlet control 28 can be programmed to work directly from valid coded signals generated by non-network transmitters. In other words, the network may send signals directly to the bridge device so as to allow for switching on of an appliance or other powered device connected to the power outlet control. As such, the bridge device may also function to directly control an appliance on the network.

As noted previously, the network administrator may set up different functions for different transmitters with the use of a "master controller." By default, once a hand held transmitter or a HomeLink™ transceiver is programmed into the bridge device, the bridge device simply confirms the valid transmitter signal and re-transmits the signal using the home network protocol. In this case the signal always says "turn on all devices in my group." The group is assigned by the device identified as a "master controller." This device may be a hand held remote control with a small LCD display, such as a personal digital assistant or even a properly programmed cell phone. With this device a user can set multiple groups (a series of controllable devices such as lights) and scenes within the group (set all lights in group to 50% scene one; set half of the lights off and the other half to full on, scene 2, etc).

Figure 7:
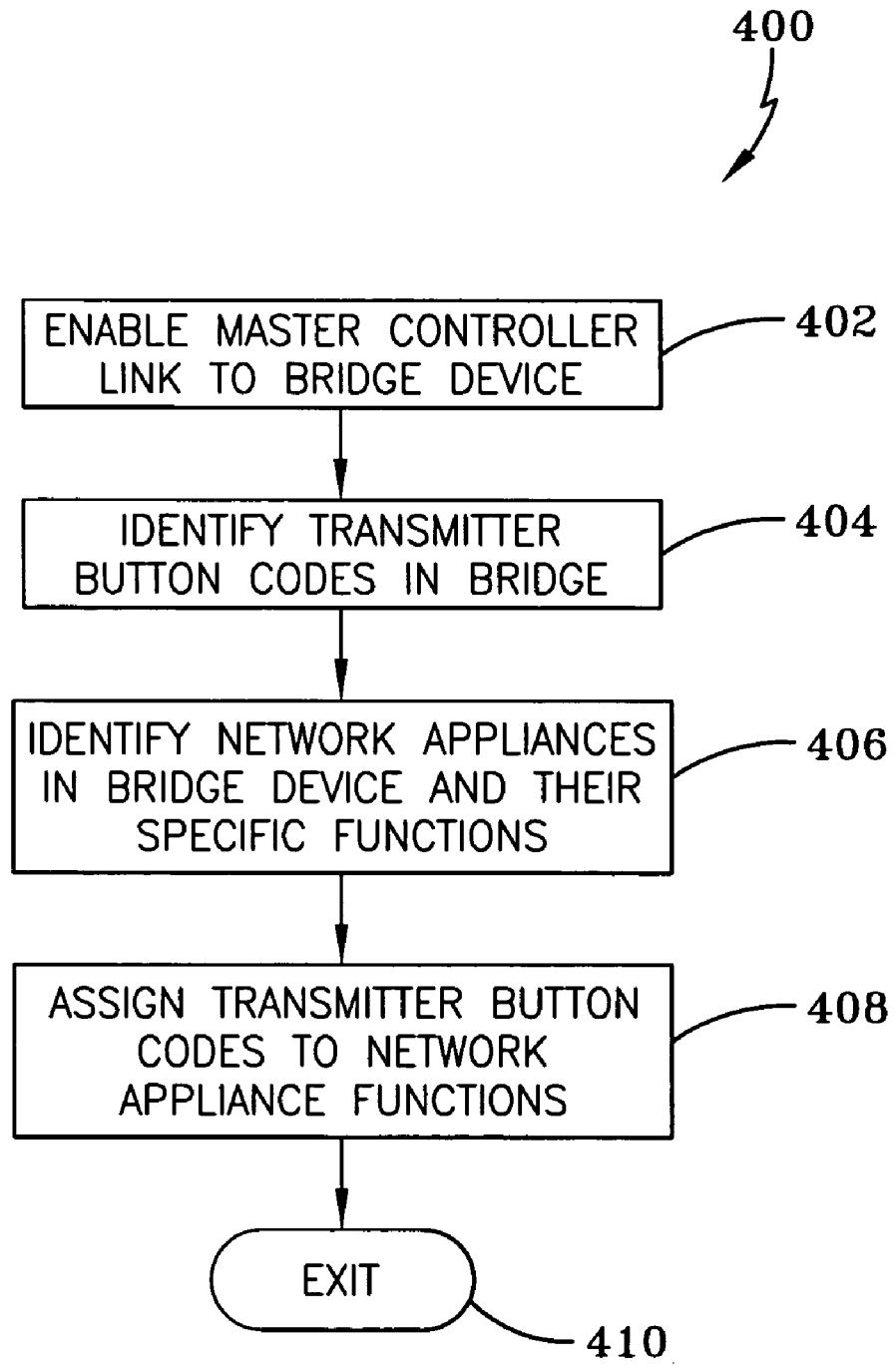
FIG. 7 is an operational flow chart illustrating the operational steps for assigning functions in the home network to a transmitter.

Referring now to FIG. 7, it can be seen that a methodology for assigning particular functions to a transmitter is designated generally by the numeral 400. Once a series of transmitters are programmed into the bridge, a user with a master controller incorporates the bridge device into a group by pressing the acquire button on the master controller at step 402. The bridge device then "dumps" all the id codes of all the transmitters currently programmed into the bridge at step 404. At step 406, the master controller identifies all the network appliances associated with the bridge device, and, if available, any particular functionality associated with the appliance. For example, lights associated with the network may have different lighting levels. In any event, the user may, at step 408, re-configure the default "turn all on" command for each ID code stored and re-assign a different function. For example, a user may program two buttons from his HomeLink™ vehicle into the bridge. Then he acquires the button ID's from the bridge device into his master controller. At that point he may set one of his HomeLink™ buttons to "lock house" which will turn all lights off in the house, set the alarm system on, and close the garage door. The second button can then be assigned to "open house" which will open the garage door, turn on the lights in the garage, deactivate the burglar alarm, and unlock the front door. All of the manipulations are preformed by pressing menu buttons on the master controller. When the assignment step(s) are complete, the process is exited at step 410. The bridge device will not have master controller functions, but it has the capability of transmitting the proper signal to the network once the master controller assigns new functions for each ID code.

Whenever a transmitter signal is received by the bridge device 10, the power outlet may be energized thus turning on any appliance connected to the switch outlet. The network user may choose to provide a "scene" controlled to the power outlet thus assigning the function it will do with a specific transmitter code. In this embodiment, one transmitter may turn on the power outlet and another may turn the power on for five minutes, and yet another transmitter may do nothing at all. It will further be appreciated that the same functions can be performed backwards from the network world. In other words, since the network devices have access to the controller, the power outlet can be controlled to perform the specific functions.

Based upon the foregoing, the advantages of the invention over the known prior art are readily apparent. The bridge device contains all the circuit elements required to learn and teach transmitters to the bridge device and also for the bridge device to join a home network or any network connected to a plurality of appliances or electronic devices. The bridge device has a built-in, battery-operated transmitter which has the sole purpose of teaching a coded signal to a learning transmitter without the need for a third handheld transmitter. As such, HomeLink devices, which are primarily utilized for opening and closing garage doors, wherein the garage door operators are receptive to HomeLink signals, can also be employed to directly communicate with the bridge device. Yet another advantage of the present invention is that the bridge 10 can generate a multitude of unique coded signals so that a unique code can be taught to every transmitter joining the network. Additionally, the teaching of the learning transmitter to the bridge device enables the learning of standard transmitters such as those found in association with garage door openers, thus making the system compatible with more devices.

Still yet another advantage of the present invention is that bridge device is capable of recognizing a multitude of modes by monitoring the external power supply and the learn/teach button thus simplifying the user interface. Still yet another advantage of the present invention is that the bridge device is equipped with all the elements necessary to join a home network. Accordingly, it can convert signals received from non-network devices automatically without user intervention, thus, making the non-network devices act as if they were a part of the network. The bridge device is also advantageous in that it may be programmed out of the factory to respond to specific types of transmitter codes such as those found in garage door openers. The bridge may also be equipped to respond to specific types of coded network standards. Accordingly, the devices are adaptable for use with different types of home network standards as they are adopted by the industry. When the device is used with the proper transmitters and network codes, the interfacing conversion are automatically performed by the bridge device without the need to perform any additional acts, or interfacing programming functions by the user.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A bridge device linking at least one transmitter to a home network, comprising:
   a transmitter signal receiver adapted to receive transmitter signals in a transmitter format from the at least one transmitter;
   a network signal transceiver adapted to transmit and receive network signals in a network format to and from the network;
   a bridge controller connected to said transmitter signal receiver and said network signal transceiver, said bridge controller converting said signals between said formats;
   a power supply system connected to said bridge controller; and
   a teach function module connected to said bridge controller, said teach function module disabled when said power supply receives power from an external power source.

2. The device according to claim 1, further comprising:
   an internal power source connected to said power supply system; and
   said bridge controller implementing different modes depending upon said power supply system's source of power.

3. The device according to claim 2, further comprising:
   a learn/teach switch connected to said bridge controller, wherein actuation of said learn/teach switch when said teach function module is enabled causes said module to generate a code receivable by the at least one transmitter which is a learning transmitter which is adapted to receive and store said code.

4. The device according to claim 3, wherein the learning transmitter is adapted to emit said code upon receipt of a predesignated stimulus, and said code is received by said transmitter signal receiver.

5. The device according to claim 4, wherein said predesignated stimulus is one of a button actuation on the at least one learning transmitter, and entry of the at least one learning transmitter into a proximity range with respect to said transmitter signal receiver.

6. The device according to claim 2, further comprising:
   a teach function module connected to said bridge controller, wherein said teach function module is disabled, and said transmitter signal receiver and said network signal receiver are enabled when said power supply system is connected to said external power source.

7. The device according to claim 6, further comprising:
   a learn/teach switch connected to said bridge controller, wherein actuation of said learn/teach switch places said bridge controller in a transmitter learn mode, and wherein generation of said transmitter signal by the at least one transmitter while said bridge controller is in said transmitter learn mode enables storing of said transmitter code contained within said transmitter signal in said controller.

8. The device according to claim 6, further comprising:
a learn/teach switch connected to said bridge controller, wherein actuation of said learn/teach switch generates a join network signal by said network signal transceiver which is receivable by the home network.

9. The device according to claim 8, wherein said join network signal is generated upon multiple actuations of said learn/teach switch in a predetermined period of time.

10. The device according to claim 6, further comprises:
a learn/teach switch connected to said bridge controller, wherein a solitary actuation of said learn/teach switch places said bridge controller in a transmitter learn mode, which stores subsequently received transmitter signals in said controller, and wherein multiple actuations of said learn/teach switch places said bridge controller in a join network mode which enables communication between said controller and the home network.

11. The device according to claim 10, wherein said network transceiver is linked to the home network and facilitates association of the transmitters with appliances connected to the home network.

12. The device according to claim 1, further comprising:
a master controller in communication with said bridge controller, said master controller linking specific transmitter signals to specific network signals.

13. A method for enabling a home network bridge device, comprising:
providing a controller linked to a transmitter signal receiver, a network signal transceiver, and a power supply system;
detecting a type of power source connected to said power supply system;
selectively enabling a teach function module connected to said controller depending upon said type of power source detected; and
disabling said teach function module if an external power source is detected by said controller.

14. The method according to claim 13, further comprising:
actuating a learn/teach switch which is connected to said controller and which enables said transmitter signal receiver;
receiving a transmitter signal generated by at least one type of transmitter, said transmitter signal containing a code associated with the at least one transmitter; and
storing said code in said controller.

15. The method according to claim 13, further comprising:
actuating a learn/teach switch which is connected to said controller and which enables said network signal transceiver; and
generating a network join signal that is formatted to be received by a home network.

16. The method according to claim 13, further comprising:
actuating a learn/teach switch which is connected to said controller;
determining a number of actuations of said learn/teach switch in a predetermined period of time;
enabling said transmitter signal receiver if only a single actuation of said learn/teach switch in said predetermined period of time so as to enter a transmitter learn mode;
enabling said network signal transceiver if more than one actuation of said learn/teach switch in said predetermined period of time is detected so as to enter a network join mode;
receiving transmitter signals if in said transmitter learn mode and storing a code contained within said transmitter signal; and
generating a network join signal by said network signal transceiver if in said network join mode.

17. The method according to claim 16, further comprising:
entering a normal mode of operation after said network join mode and said transmitter learn mode have lapsed;
receiving said code in said transmitter signal receiver;
transferring said code to said controller;
converting said code into a network signal; and
emitting said network signal via said network signal transceiver.

18. The method according to claim 17, further comprising:
enabling said network signal to control operation of at least one appliance.

19. The method according to claim 17, further comprising:
assigning a unique code to each said transmitter signal learned by said controller; and
converting each said unique code into a unique network signal controlling operation of at least one appliance with said unique network signal.

20. The method according to claim 17, further comprising:
providing a power outlet control connected to said controller; and
enabling said network signal to control operation of said power outlet control.

21. The method according to claim 17, further comprising:
providing a power outlet control connected to said controller; and
enabling said transmitter signal to control operation of said power outlet control.

22. The method according to claim 13, further comprising:
actuating a learn/teach switch that is connected to said controller; and
enabling said network signal transceiver to enter a network join mode if more than one actuation of said learn/teach switch in said predetermined period of time is detected so as to enable the network bridge to join a network.

23. A method for enabling a home network bridge device, comprising:
providing a controller linked to a transmitter signal receiver, a network signal transceiver, and a power supply system;
detecting a type of power source connected to said power supply system; selectively enabling a teach function module connected to said controller depending upon said type of power source detected;
enabling said teach function module if an internal power source is detected by said controller;
activating a learn state for a transmitter to be associated with the bridge device;

actuating a learn/teach switch connected to said controller while said transmitter learn state is active;

generating a code by said teach function module; and receiving and storing said code in the transmitter.

24. A method for operating appliances connected to a home network system, comprising:

providing a bridge controller linked to a transmitter signal receiver and a network signal transceiver;

receiving a transmitter signal in a transmitter format, said transmitter signal sent from a non-network transmitter;

converting said transmitter signal into a network signal in a network mode format;

emitting said network signal from said network signal transceiver for receipt by the home network system which controls operation of at least one appliance;

linking a master controller to said bridge controller;

dumping at least one button ID code associated with said non-network transmitter to said master controller;

identifying at least two functions maintained by said at least one appliance; and reassigning said at least one button ID code identified at said dumping step with one of said at least two functions identified at said identifying step.

25. The method according to claim 24, further comprising:

learning said transmitter signal to said bridge controller; and learning said network signal transceiver to the home network, wherein said learning steps occur prior to said converting step.

26. The method according to claim 25, further comprising:

switching a power outlet control between on and off states upon receipt of said transmitter signal.

27. The method according to claim 25, further comprising:

switching a power outlet control between on and off states upon receipt of a network command signal received by said network signal transceiver.

28. The method according to claim 24, further comprising:

learning said transmitter signal to said bridge controller; and learning said network signal transceiver to the home network, wherein said converting step occurs prior to said learning steps.

* * * * *